United States Patent [19]
Crosby

[11] 3,928,293
[45] Dec. 23, 1975

[54] POLYMERIC REAGENT
[75] Inventor: Guy A. Crosby, Palo Alto, Calif.
[73] Assignee: Dynapol, Palo Alto, Calif.
[22] Filed: Apr. 1, 1974
[21] Appl. No.: 456,731

[52] U.S. Cl. .............. 260/79; 252/372; 260/79.1; 260/79.3 R; 260/79.7; 260/606.5 B
[51] Int. Cl.² .................................... C08F 28/02
[58] Field of Search........ 260/79, 79.1, 79.3 R, 79.7, 260/606.5 B

[56] References Cited
OTHER PUBLICATIONS
Braun et al., Journal of Organic Chemistry, Vol. 36, No. 16, 1971, pp. 2388-2389.

Primary Examiner—Melvyn I. Marquis
Attorney, Agent, or Firm—William H. Benz

[57] ABSTRACT

Complexes of boron trihydride with solid particulate insoluble cross-linked thiohydrocarbon polymers are disclosed. The materials are useful in organic reduction and hydroboration reactions, and in these uses offer handling conveniences over existing forms of boron trihydride.

9 Claims, No Drawings

POLYMERIC REAGENT

BACKGROUND OF THE INVENTION

1. Field of the Invention

This invention relates to polymeric reagents. More particularly, it relates to a new class of boron hydride (borane)-containing polymeric reagents, their preparation, and use as hydroboration and reducing agents.

2. The Prior Art

Since the 1930's, it has been recognized that hydrides of boron, such as diborane ($B_2H_6$), are useful strong chemical reagents. As pointed out in Chapter 17 of H. C. Brown's 1962 book, *Hydroboration* (W. A. Benjamin, Inc.), diborane may be used to reduce aldehydes, ketones, alkyl halides, lactones, oxides, esters, acids, nitriles, and olefinically-unsaturated materials. Diborane also enters into a wide range of hydroboration reactions as are set forth in other chapters of Brown's book. Unfortunately, diborane is a gas which makes its use often inconvenient. Diborane also suffers from the disadvantage of being explosive and so reactive that it is not suitably stable for many applications. It is so unstable that it cannot be safely stored over prolonged periods and used as required in the laboratory or in industrial scale applications, but generally must instead be generated at each demand. One solution to this problem has been proposed by Braun et al at page 2388 of Volume 36 (1971) of *J. Org. Chemistry*. They note that diborane can be stabilized, while retaining sufficient reactivity for most hydroboration and reduction applications, by forming a dimethyl sulfide adduct,

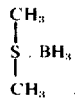

This adduct is a low-boiling liquid which vaporizes readily (boiling point:35°–40°C), so it cannot be simply handled. This stabilized form of diborane has an additional serious drawback of its own; when it reacts and frees its complexed $BH_3$, it also releases dimethyl sulfide gas as a coproduct. Dimethyl sulfide gas is the most obnoxious of the odiferous alkyl sulfides, and creates a major problem, not only contaminating other reactants and products, but also requiring the use of hoods or other enclosed work spaces to avoid fouling the entire area of use.

It is an object of this invention to provide a new form for boron hydride reagents which will eliminate the problems associated with the prior art and permit wider and more convenient use of boron hydride.

STATEMENT OF THE INVENTION

A new class of stabilized boron hydrides has now been discovered. These materials are complexes of boron trihydride ($BH_3$), with solid particulate insoluble cross-linked thiohydrocarbon polymers. The thiohydrocarbon polymers may be more particularly characterized as solid, particulate, insoluble, cross-linked aliphatic, cycloaliphatic or aromatic thiohydrocarbon polymers containing a substantial plurality of sulfur atoms; said sulfur atoms being in a thioether configuration. The boron hydride complexes are characterized by the fact that a major proportion of the sulfur atoms in the thiohydrocarbon polymers (at least 80%) are in complex combination with $BH_3$ molecules. These new boron hydride thiopolymer complexes are stable at room temperature. This stability, and the fact that the complexes are solids, makes them easy to use and recover. Suprisingly, though stable, they are reactive enough to permit their facile use in the wide range of reactions for which diborane is known. Under conditions of reduced pressure or sufficient heat they can be made to release $BH_3$ molecules and thus serve as a means of storing diborane.

DETAILED DESCRIPTION OF THE INVENTION

This detailed description deals with the new boron hydride thiopolymer complexes. It begins by describing the thiopolymers themselves. These thiopolymers, while an integral part of the complexes of this invention, themselves do not constitute a part of this invention.

THE THIOPOLYMERS

The thiopolymers employed in the complexes of this invention are physically characterized as solid, particulate materials. They are insoluble in the medium of use, which is defined herein to mean that they are not more soluble than about 0.1% wt (basis reaction medium). Preferably, they are porous. Suitable particle sizes range from diameters of 0.01 mm to about 20 mm, preferably 0.1 mm to 5 mm, while particle pore diameters may range from 300A to 3,000A. Chemically, the thiopolymers are characterized as being polymeric thiohydrocarbons, that is, as being polymers containing only atoms of sulfur, hydrogen, and carbon. The sulfur atoms are present in the polymers in a thioether configuration; i.e., a—C—S—C—configuration.

As a rule, the polymers contain at least one sulfur atom for each 30 carbon atoms present in the polymer. Preferably, they contain, on average, one sulfur atom for each 10 to 20 carbon atoms. The polymers are cross-linked so as to not be soluble in organic solvents, such as the reaction media. Thus, each particle is essentially a matrix of linked-together thiohydrocarbon chains. Generally, there are from about one to about ten cross-links for every 100 sulfur atoms. These cross-links may be simple bonds between the thiohydrocarbon chains or may be cross-linking groups, so long as they too contain only hydrogen, carbon and sulfur, such as divinylbenzene or the like.

The thiopolymers may contain aromatic unsaturation among carbon atoms, or they may be saturated; that is, the polymers may be aromatic or saturated aliphatic or cycloaliphatic polymers. In no case should the polymers contain more than residual traces of olefinic or acetylenic unsaturation or oxygen or nitrogen atom-containing active groups; for example, aldehyde, acid or nitro groups, as these groups will react with and hence consume the boron hydride when it is added.

Suitable thioether group-containing polymer chains may take on any one of the following three generalized structures: First is an —(S—A)ₙ— structure, wherein S is sulfur, A is an aromatic or saturated aliphatic or cycloaliphatic hydrocarbon of not more than 30 carbons. In all of these formulae, $n$ is included to indicate that these are polymeric materials. In reality, because of the cross-linked nature of these materials, it is not possible to put meaningful value on n. Cross-links are not shown in any of these formulae. They emanate from the various hydrocarbon portions of the polymers and are present in an amount of from about one to about 10 links for each 100 sulfur atoms. Preferably, these are from about one to three cross links—for every 100 sulfur atoms.

The second generalized structure is

wherein A' independently of A is a saturated aliphatic or cycloaliphatic or aromatic hydrocarbon selected so the total carbons of A + A' is not more than 30 carbon atoms, and A and S are as already defined: Third is a

structure wherein A'' is a saturated aliphatic or cycloaliphatic or aromatic hydrocarbon capable of forming two thioether links with a single sulfur molecule and having not more than 30 carbon atoms. Examples of these three general groups of materials include: as —(S—A)$_n$— materials:
poly(xylylenethioether), poly(benzylthioether)

poly(ethylenethioether), and poly(cyclopentylthioether): —(S—CH$_2$—CH$_2$)$_n$—

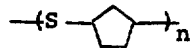

as

materials, poly(vinylbenzylmethylsulfide),

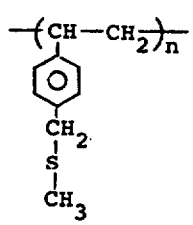

and poly(vinylmethylsulfide);

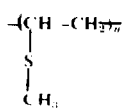

and as

materials, isomers of poly(dihydrothiophene) such as

These materials additionally contain cross-linking groups (which are not shown) either copolymerized in them or attached to the A or A' groups.

While any of the aforesaid materials might suitably be employed as thiopolymers, it is preferred to employ polystyrene-based thioethers simply because of the ready commercial availability of solid particulate polystyrenes. The preferred polystyrene thioethers will have either of two general structural formulae:

wherein X' is a lower alkyl of from 1 to 6 carbons inclusive, and X is a lower saturated alkyl of from 1 to 6 carbons inclusive. Preferred among these polystyrene thioethers are those wherein X' is selected from methyl, ethyl, n-propyl, and isopropyl groups; and X is either not present or selected from methyl, ethyl and n-propyl and isopropyl groups.

Methods for preparing these polythioethers will be fully described in the Examples.

THE BORANE COMPLEXES

The polythioethers may be converted into the desired borane complexes by contact with diborane gas (either as commercially-available or as generated by the method of H. C. Brown which is shown in Example I, herein). These methods for addition of borane may be used to regenerate spent complex as well, if desired, thereby reducing the effective cost of the complex.

The borane complexes find use as a wide range of hydroboration and reduction reactions. The complexes are not as reactive as diborane itself, but will, with increased temperature or reaction time, enter into essentially the same reactions as diborane will. These include reducing aldehydes and ketones to alcohols, reducing lactones to glycols, reducing oxides, esters and carboxylic acids to alcohols, reducing nitrites to amines, and converting olefins to organic boranes.

To carry out these reactions, the solid borane reagent is intimately contacted with a fluid phase containing the compound to be reduced or hydroborated at ambient or elevated temperature. The fluid phase may be a vapor phase, but generally is liquid. The fluid phase may include solvents substantially inert to reduction or hydroboration such as diglyme, ethers, or saturated or aromatically unsaturated hydrocarbons or may, in the case wherein the material to be reduced or hydroborated is a liquid, consist essentially of the material itself. Generally, temperatures in the range of from about room temperature (20°C) to about 100°C are employed, as are the reaction times of from about 5 minutes to about 24 hours.

The invention will be further described by the following Examples which are intended as illustrations and are not to be construed as limiting the scope of the invention.

EXAMPLE I

A. Preparation of Thiohydrocarbon polymer

Polystyrene (21.2 g) in the form of 20-40 mesh cross-linked beads are stirred with 13.4 g of aluminum chloride and 37.8 ml of chloromethyl methyl ether in 146 ml of dichloroethylene. The reaction is monitored by ultraviolet absorbance and continued until the polystyrene is chloromethylated to

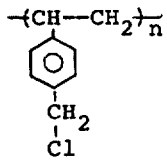

This product is separated, washed, and dried. A 10 g portion is suspended in 100 ml of tetrahydrofuran and 30 ml of hexamethylphosphoric triamide. The mixture is cooled to 0° and treated with 14.5 ml of aqueous potassium methyl sulfide. Additional hexamethylphosphoric triamide is added until the aqueous phase is substantially reabsorbed. The mixture is heated to 50°-60°C for 12 hours, cooled, filtered and washed with base, water, cold HCl/dioxane, water/dioxane, and dioxane and ether. The product is dried to yield poly(-vinyl)benzylmethylsulfide

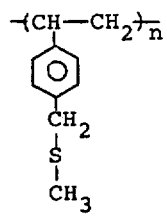

Analysis of this material shows that it contains 15.72% by weight of sulfur.

B. Formation of Borane Complex

Diborane is generated as follows: Sodium borohydride (1.14 g) is dissolved in 35 ml of dry diyglyme (distilled) and added dropwise to a flask containing 5 ml of boron trifluoride etherate in 25 ml of dry diyglyme of 0°C. Dry argon gas sweeps the generated diborane, along with diglyme and diethyl ether contaminants, from the flask through a dry ice trap (to remove diglyme and diethyl ether), and into a second flask containing 2.0 g of the polymer product of part A, which is cooled at liquid nitrogen temperature (−196°). After the generation of diborane and its addition to the polymeric sulfide are complete, the polymer is allowed to warm to room temperature. The polymer is analyzed and determined to be the desired borane adduct,

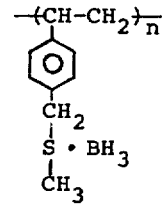

containing approximately 7% by weight of borane (BH$_3$) or 4.92 millimoles of boron/gram. This material is stable at ambient conditions and is stored under argon.

C. Use of the Borane Complex

The solid borane complex of part B is placed in 25 ml of diglyme. 1.2 Grams of acetophenone is added and the slurry is stirred at room temperature overnight. Then 3 ml of methanol are added and the slurry is stirred for an additional hour. The solid particles of borane polymer complex are simply filtered from the reaction mixture and rinsed for reuse. The product is analyzed by NMR. It is found that essentially quantitative (>95%) conversion of the acetophenone to alcohol has occurred.

EXAMPLE II

A 20 mg portion of the borane polymer prepared in part B of Example I is added to an excess (1 g) of 1-decene and stirred overnight. The mixture is treated with an NaOH solution and an H$_2$O$_2$ solution and heated to 80°C for 1 hour, cooled to 0°C, and extracted with ether. The extract is washed and dried and freed of excess 1-decene. NMR analysis shows that this product is the primary alcohol derivative of 1-decene, 1-decanol.

EXAMPLE III

A. A cross-linked polyphenylene sulfide,

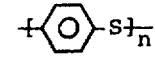

is prepared by a modified version of the method of Handlovits set out at pages 131 et sec of *Macromolecular Syntheses*, Volume 3 (1968). Bromine is reacted with a mixture of 97 parts thiophenol and 3 parts of dithioresorcinol at 50°-55°C to yield bis-(p-bromophenyl) disulfide containing about 3% p-bromophenyldisulfide sidechains. This material is refluxed in hexanol with pyridine and electrolytic copper dust for 6 hours to form the copper salts of p-bromothiophenoxide and bromo-dithiophenoxide,

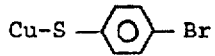

and 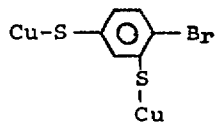

These pyridine salts are placed in triethylene glycol with pyridine and heated to 200°C for 7 days with stirring to yield the desired cross-linked insoluble phenylene sulfide polymer, which is washed, extracted, dried, and broken up into 1 mm particles.

B. The polymer of part A is contacted with diborane in accord with the procedure of part B of Example I to yield a stable borane complex. This complex is capable of entering into the reactions characteristic of diborane and of being regenerated after use.

EXAMPLE IV

A. A cross-linked poly(cyclohexenesulfide),

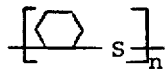

is prepared using a modified version of the method of Empen and Stille which is set forth at pages 56–7 of *Macromolecular Syntheses* Volume 3 (1968). Five grams of cyclohexene sulfide, 0.10 g of cyclohexadiene disulfide, 25 ml of anhydrous methylene chloride, and 0.28 ml of boron trifluoride etherate are combined and maintained at room temperature for about 2 days. Polymerization occurs. Polymerization is quenched by methanol addition. The polymer is isolated by filtration. It is a porous, solid product containing about 2% cross-links, essentially insoluble in common organic solvents.

B. When the product of part A is reacted with diborane in accordance with the method of part B of Example I, a product having the structure (disregarding cross-links) of

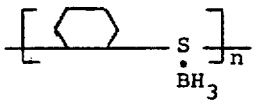

results, which can be utilized in the reaction of diborane.

EXAMPLE V

A. A cross-linked polysulfoxide polymer of the formula

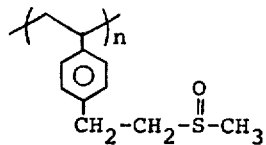

is produced following the procedures of Ayres and Mann in *Polymer Letters*, Volume 3 (1965), pages 505–508. This polymer is then subjected to reduction with four equivalents per equivalent of polymer of lithium aluminum hydride in ether, as is taught by Bordwell and McKellin in *JACS*, Volume 73 (1951), page 2251, to yield a cross-linked, insoluble sulfide polymer of the formula

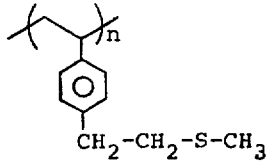

B. The polymer of part A is contacted with diborane to yield a complex of this invention, which may be used in place of diborane in chemical reactions such as to reduce phenyl cyanide to benzylamine. This reaction may be carried out by contacting 3 millimoles of phenyl cyanide with about 2 millimoles of the product of this example at room temperature in benzene solvent for about 18 hours. After the reaction is quenched with 0°C methanol and the polymeric sulfur borane complex is removed by filtration and rinsed, the benzylamine may be isolated by distillation.

EXAMPLE VI

To 13.0 g (125 millimoles) of macroreticular polystyrene (Amberlite XE-305, Rohm-Haas) and 27.6 g (67.5 m moles (of thallic acetate sesquihydrate [Tl(OAc)$_3$·1.5 H$_2$O] suspended in 200 ml of carbon tetrachloride is added dropwise with stirring 12.8 g (4.1 ml; 80 millimoles) of bromine in 30 ml of carbon tetrachloride. The mixture is then stirred at 50°–60°C until all the bromine color disappears. The beads are filtered and washed with a mixture (1:1) of 30% aqueous HCl and dioxane, a mixture (1:1) of water and dioxane, dioxane, THF, and ether. The beads are further dried in vacuo at 50°–60°C overnight. The brominated polystyrene beads are refluxed in 500 ml of 0.1 N aqueous HCl solution, then in 50% aqueous dioxane, and finally in dioxane. The elemental analysis of vacuum dried beads indicate 65% of the theoretical bromine (3.56 millimoles Br/g).

To a stirred suspension of 14.5 g (51.6 millimoles) of these poly (p-bromostyrene) beads in tetrahydrofuran (200 ml) is added at −78°C under argon 50 ml of 2.28 M n-butyllithium hexane solution. Stirring is continued at −78°C for 0.5 hr and then at room temperature for 1 hour. The tetrahydrofuran solution is then removed from the beads and an additional 150 ml of THF and 30 ml of 2.28 M n-butyllithium (68.4 m moles) is added at −78°C and stirred at room temperature for 1 hour. The beads are removed again, treated with 200 ml of THF and 20 ml of methyl disulfide (distilled), stirred at −78°C for 15 minutes and at room temperature for one-half hour, and then refluxed under argon for one hour. The cooled mixture is diluted for 100 ml of water and filtered. The beads are washed with water; a 3:1 mixture of dioxane/water; and dioxane. Finally, the beads are refluxed in dioxane for one-half hour and the dioxane is distilled off until the distillate reaches the boiling point of dioxane (101°C). Analysis of vacuum-dried beads shows 54% of the theoretical sulfur incorporation as poly (p-methylmercapto styrene).

This product is contacted with diborane gas in accord with part B of Example I to yield the polymer

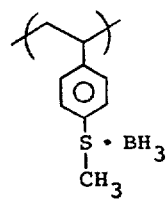

which enters into the reactions of diborane, and may be regenerated after use by recontact with diborane.

I claim:

1. A polymeric boron hydride reagent comprising a particulate, solid, cross-linked aliphatic, cycloaliphatic, or aromatic organic polymer containing a substantial plurality of sulfur atoms in a thioether configuration and, in complex combination with a major proportion of said sulfur atoms, boron hydride molecules.

2. The polymeric boron hydride reagent of claim 1, wherein the polymer contains not less than one sulfur atom for each 30 carbon atoms and has at least 80% of its sulfur atoms in complex combination with boron hydride molecules.

3. The polymeric boron hydride reagent of claim 2, wherein the polymer is further characterized as a cross-linked polystyrene having sulfur atoms pendant from its aromatic rings.

4. The polymeric boron hydride reagent of claim 2, comprising repeating units of the general structural formula

wherein A and A' independently are aromatic or saturated aliphatic or cycloaliphatic hydrocarbons, and the total carbons of A and A' are not more than 30.

5. The polymeric boron hydride reagent of claim 2, comprising repeating styrene units of the formula

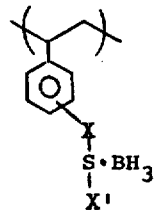

wherein X' is a lower alkyl of from 1 to 6 carbons inclusive, and X is a lower alkyl of from 1 to 6 carbon atoms inclusive.

6. The reagent of claim 5, wherein X and X' are each independently selected from the group of methyl, ethyl, n-propyl, and isopropyl.

7. The reagent of claim 5, wherein X and X' are each methyl groups.

8. The polymeric boron hydride reagent of claim 2, comprising repeating styrene units of the formula

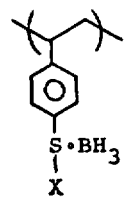

wherein X is a lower alkyl of from 1 to 6 carbon atoms.

9. The reagent of claim 8, wherein X' is methyl.

* * * * *